United States Patent [19]

Broadt

[11] Patent Number: 4,470,801
[45] Date of Patent: Sep. 11, 1984

[54] PHOTOFLASH UNIT WITH CIRCUIT PATTERN FOR REDUNDANT SWITCHING OF LAMPS

[75] Inventor: David R. Broadt, Lewisburg, Pa.

[73] Assignee: GTE Products Corporation, Stamford, Conn.

[21] Appl. No.: 330,417

[22] Filed: Dec. 14, 1981

[51] Int. Cl.$^3$ .............................................. F21K 5/00
[52] U.S. Cl. ...................................... 431/359; 362/15
[58] Field of Search .................... 431/359, 365; 362/6, 362/10, 13, 15, 5

[56] References Cited

U.S. PATENT DOCUMENTS

| | | | |
|---|---|---|---|
| 3,994,664 | 11/1976 | Cusano | 431/359 |
| 4,040,777 | 8/1977 | Collins et al. | 431/359 |
| 4,290,748 | 9/1981 | Collins et al. | 431/359 |
| 4,324,543 | 4/1982 | Broadt | 431/359 |
| 4,329,140 | 5/1982 | Johnson | 431/359 |
| 4,334,856 | 6/1982 | Broadt et al. | 431/359 |
| 4,371,914 | 2/1983 | Broadt et al. | 362/15 |

Primary Examiner—Randall L. Green
Attorney, Agent, or Firm—Edward J. Coleman

[57] ABSTRACT

A photoflash unit comprising a plurality of 2n flashlamps attached to a printed circuit board and disposed in a linear array with the longitudinal axes of respective lamps aligned in parallel. Circuit patterns on the circuit board include a plurality of n selective terminal means, each associated with a respective pair of the lamps and connected to one lead-in wire of each of the lamps of the associated pair, and a common terminal associated with all of the 2n lamps but directly connected to the other lead-in wire of one lamp of each pair. Groups of circuit pattern extensions are located behind alternate lamps of the array, the first group comprising two spaced apart segments and the remaining groups each comprising three spaced apart segments. Each group of segments is covered with a mass of radiation sensitive switch material to thereby provide respective solid state switches between bridged segment gaps which are activated upon receiving radiant energy emitted by an adjacent lamp. The circuit pattern arrangement provides a pair of respective normally open switches coupled between the common terminal and a lead-in wire of the other lamp of each pair of lamps, except for the last, one switch positioned for activation by the prior lamp in sequence and the other switch positioned for activation by the next lamp in sequence. In this manner, the second lamp of the first n-1 pairs of lamps can be switched by either of two parallel radiation switches, thereby providing redundant switching in the event that the first lamp in any of the first n-1 pairs of lamps is defective.

21 Claims, 6 Drawing Figures

PHOTOFLASH UNIT WITH CIRCUIT PATTERN FOR REDUNDANT SWITCHING OF LAMPS

BACKGROUND OF THE INVENTION

This invention relates to multilamp photoflash units having circuit means for causing a different lamp to be flashed upon each occurrence of a firing pulse produced in synchronism with the opening of a camera shutter.

Numerous multilamp photoflash arrangements with various types of sequencing circuits have been described in the prior art. Series and parallel-connected lamp arrays have been shown which are sequentially fired by mechanical switching means, simple electrical circuits, switching circuits using the randomly varied resistance characteristics of the lamps, arc gap arrangements, complex digital electronic switching circuits, light-sensitive switching means and heat-sensitive switching devices which involve melting, fusing or chemical reaction in response to the radiant energy output of an adjacently located flashlamp.

One currently marketed eight-lamp photoflash unit employing radiation switches is described in U.S. Pat. Nos. 3,894,226 and 4,017,728 and referred to as a flip flash. A ten-lamp version is described in U.S. Pat. Nos. 4,156,269 and 4,164,007. The unit comprises a planar array of high voltage flashlamps mounted on a printed circuit board with an array of respectively associated reflectors. Circuitry on the board includes a plurality of solid state switches that chemically change from a high to low resistance, so as to become electrically conducting after exposure to the radiant heat energy from an ignited flashlamp operatively associated therewith. The lamps of the array are arranged in two equal groups disposed in the upper and lower halves respectively of the rec- tangular-shaped circuit board. A pair of terminal contacts at the lower end of the unit is provided for activation of the upper group of lamps while a set of terminal contacts at the top of the unit is operatively associated with the lower group of lamps. The application of sucessive high-voltage pulses (e.g., 500 to 4,000 volts from, say, a piezoelectric source controlled by the shutter of a camera in which the array is inserted) to the terminal contacts at the lower end of the unit causes the lamps at the upper half of the array to be sequentially ignited. The array is then turned end for end and again inserted into the camera in order to flash the remaining group of lamps. In the flip flash unit, therefore, all of the lamp sequencing circuitry is self-contained in the removable photoflash unit, and the only function of the camera is to produce successive firing pulses in response to actuation of the camera shutter.

Another type of multilamp array currently on the market employs lamp-reflector units in linear rows facing in opposite directions, such as described in U.S. Pat. Nos. 3,598,984; 3,598,985; and 4,032,769 referred to as a flash bar. Typically, such linear photoflash lamp arrays comprises a total of ten lamps arranged in two parallel rows of five lamps each, the lamps and reflectors of one row being staggered relative to the lamps and reflectors of the other row. The five lamps facing in one direction are connected to a respective firing circuit disposed on one side of a printed circuit board having a plug-in tab, and the five lamps facing in the opposite direction are connected to a respective firing circuit on the opposite side of the printed circuit board. Each of the lamps has a pair of lead-in wires, one of which is connected to a common circuit run which leads to a common terminal on the plug-in tab, while the other lead-in wire of each of the lamps of a group of five facing in one direction are connected to respective conductor runs leading to a set of five selective terminals on the respective side of the circuit board tab, e.g., see the aforementioned U.S. Pat. No. 3,598,985. The circuitry of this prior art flash bar unit contains no switching elements; hence, as described, for example in U.S. Pat. Nos. 3,618,492 and 3,757,643, one-at-a-time sequencing of the five lamps facing in one direction is provided by sequential application of low voltage firing pulses across the associated common terminal and successive ones of the associated selective terminals. That is, when the linear flash bar array is plugged into a camera, each time the shutter is actuated, electronic switching circuitry in the camera successively applies firing pulses in sequence to the five selective terminals (and associated common terminal) on the side of the circuit board to which the five lamps facing the camera subject are connected. When the five lamps facing in one direction are expended, the flash unit must be removed from the camera, rotated 180 degrees, and then reinserted in the camera circuit so that the five unused lamps are connected to the camera switching circuitry.

In the interests of compactness, simplicity of operation, and increasing the number of flash illuminated photographs that may be taken in rapid succession, it is desirable to provide a multilamp photoflash array in which all of the lamps face in the same direction and only a single set of connector terminals is required, so that removal and reorientation of the flash unit is unnecessary. Further, it is particularly desirable to provide a photoflash lamp array which is compatible with existing camera circuitry. Such a photoflash unit is described in copending U.S. application Ser. No. 217,722, filed Dec. 18, 1980, now U.S. Pat. No. 4,371,914, and assigned to the present assignee. The unit comprises a plurality of 2n flashlamps attached to a printed circuit board and disposed in a linear array with the longitudinal axes of respective lamps aligned in parallel. Circuit patterns on the cicuit board include a plurality of n selective terminal means, each associated with a respective pair of the lamps and connected to one lead-in wire of each of the lamps of the associated pair, and a common terminal associated with all of the 2n lamps but directly connected to the other lead-in wire of one lamp of each pair. The circuit board has a substantially rectangular portion with n spaced apart extensions projecting vertically from a longer side thereof, the extensions being located behind alternate lamps of the linear array. Each extension contains portions of the circuit patterns spaced apart to form predetermined gaps, and a mass of switch material is disposed on each extension to bridge the gap between circuit patterns to thereby provide a solid state radiation switch on each extension behind and adjacent to a respective lamp for receiving radiant energy emitted by that lamp. In this manner, a respective normally open switch on each circuit board extension is coupled between the common terminal and a lead-in wire of the other lamp of each pair of lamps, so that the n normally open switches are coupled between the common circuit lead-in wire of associated pairs of the 2n lamps.

In operation, common and selective terminals of the unit are adapted for connection to a source of firing pulses, and each of the switches is responsive to flashing of the directly connected lamp of an associated pair so as to connect the other lamp of that associated pair to the common terminal means. The lamps have a filament-type ignition means, and the resistance value of each lamp filament lies within a predetermined range of a resistance values. In this manner, the firing circuit to which the lamp array terminal means are connected can perform a monitoring function by passing a current of limited predetermined maximum value through each unexpended flashlamp to derive alignment signals which function to align a flashlamp sequencing circuit to bypass inoperative lamps. Accordingly, if the photoflash unit comprises ten lamps operated from a common terminal and five selective terminals, a first firing pulse will cause ignition of the directly connected lamp of the first pair of lamps, whereupon the normally open radiation switch asociated with that pair of lamps will be converted from a high to low resistance so as to directly connect the second of the first pair of lamps between the first selective terminal means and the common terminal means. Thereafter the second firing pulse will bypass the expended first lamp and cause the second lamp to be ignited via the actuated radiation switch connected between that lamp and the common terminal means. The third firing pulse will then be applied to the second terminal means connected to the second pair of lamps to ignite the lamp directly connected to that second terminal means. This firing sequence proceeds through the remaining lamps and lamp pairs as described with respect to the first lamp pair. The printed circuit board extensions particularly facilitate this operational arrangement in a compact, low-cost photoflash unit.

It is an object of the present invention to improve the just described photoflash lamp switching arrangement in a manner that will provide increased product reliability. The state of the art of photoflash manufacturing can result in a small percentage of open filament lamps, low oxygen pressure lamps, and other defects that can prevent proper lamp flashing. In the switching circuit described in the preceding paragraph, a defective lamp at a switch position, (i.e., an odd-numbered lamp in the above description) would result in two lost flashes. However, if redundant switching is employed, as described hereinafter according to the present invention, only one lamp would be lost in the above example. Thus, the failed flashed due to defective lamp can be reduced by as much as 50% in such a photoflash array.

SUMMARY OF THE INVENTION

Accordingly, it is an object of the present invention to provide a multilamp photoflash unit having improved circuit means for permitting reliable flashing of all of the lamps of the array in a predetermined sequence in response to firing pulses applied to a single set of terminal means.

A principle object of the invention is to provide an improved switching circuit implementation for an array of photoflash lamps which is adapted for operation by a firing pulse switching circuit capable of sequencing only one half of the total number of lamps of the array but including a monitoring function for pretesting unexpended lamps.

Yet another object is to provide an arrangement of solid-state radiation switches on a printed circuit board for economically accomplishing the aforementioned object functions in a reliable and compact unit package.

These and other objects, advantages and features are attained, in accordance with the invention, by a photoflash unit having means for sequentially flashing pairs of lamps (one lamp at a time) in an array using only one selective terminal per lamp pair together with a common circuit terminal. In addition, a redundant switching feature is included in the event that the first lamp of any of the first $n-1$ pairs of lamps is defective. More particularly, according to the present invention, a unique and advantageous circuit pattern configuration provides a means of switching the second lamp of any of the first $n-1$ pairs of lamps by either of two parallel radiation switches.

The photoflash unit comprises a printed circuit board having electrically conductive circuit patterns disposed on a surface thereof, the circuit patterns including a plurality of $n+1$ terminal areas at one side edge of the circuit board and a plurality of $4n$ lamp contact areas disposed at selected spaced apart locations on the circuit board. A plurality of $2n$ flashlamps are attached to the circuit board and disposed in a planar array, with each of the lamps having first and second lead-in wires secured in electrical connection with respective ones of the lamp contact areas. All of the terminal areas and lamp contact areas are disposed in the same one side of the circuit board. The terminal areas include n selective terminals each associated with a respective pair of the $2n$ lamps, with each selective terminal being electrically connected via one of the circuit patterns to a pair of lamp contact areas, each of which is connected to the first lead-in wire of a lamp of the respective pair. One of the terminal areas is a common terminal associated with all of the $2n$ lamps and directly connected via one of the circuit patterns to n lamp contact areas each connected to the second lead-in wire of a first lamp of each of the respective pairs of $2n$ lamps. The common and selected terminal areas are adapted for connection to a source of firing pulses, and the lamps are adapted via the circuit board connections for ignition according to a predetermined sequence in response to successive firing pulses applied to the terminal areas. Portions of the conductive circuit patterns extend in groups of electrically isolated segments behind alternate lamps of this predetermined ignition sequence, and the extending circuit patterns of each of the groups is spaced apart for form predetermined gaps therebetween. A mass of switch material is disposed on each of the groups of extending circuit pattern segments and bridges the gaps between the circuit pattern segments of the group, thereby providing a solid state radiation switch means on each of the groups of extending circuit pattern segments behind and adjacent to a respective lamp for receiving radiant energy emitted by that lamp. Each of the first lamps directly connected to the common terminal are located in front and adjacent to a respective one of said groups of extending circuit pattern segments, with the the circuit pattern directly connected to the common terminal having an extending segment in each of the groups. The second lead-in wire of the second lamp of each of the respective pairs of $2n$ lamps, except for the last of the $2n$ lamps in the ignition sequence, is connected to a respective lamp contact area which is connected to a respective one of the circuit patterns having a pair of extending segment portions. One of the segment portions of this pair is in the group of extending segments behind the prior lamp in the sequence, and the other segment portion of this pair is in a group of extending segments behind the next lamp in the ignition sequence. The second lead-in wire of the last of the $2n$ lamps in the ignition sequence is connected to a respective lamp contact area which is connected to a respective one of the circuit patterns having an extending segment portion in the group of extending segments behind the prior lamp in sequence. Each of the radiation switch means is capable of conversion from a high electrical resistance to a low electrical resistance when exposed to radiation emitted from a flashlamp disposed adjacent to the switch means.

In the resulting pattern arrangement, the extending electrically isolated circuit pattern segments behind the first lamp in the ignition sequence consists of two spaced apart segments, while each of the remaining groups of extending electrically isolated circuit pattern segments consist of three spaced apart segments. In the three segment arrangement, the segment extending from the circuit pattern directly connected to the common terminal is disposed between the other two segments of the group. In this manner, the switch means and groups of extending circuit pattern segments provide a plurality of $2n-1$ normally open switches. The second lead-in wire of the second lamp of each of the respective pairs of 2n lamps, except for the last of the 2n lamps in the ignition sequence, is coupled in electrical circuit through a respective parallel pair of the switches to said common terminal. A single one of the switches is coupled in electrical circuit between the common terminal and the second lead-in wire of the last of the 2n lamps of the sequence.

In operation, the common and selective terminals are adapted for connection to a source of firing pulses, and each of the switch means is responsive to the flashing of the directly connected lamp of an associated pair so as to connect the other lamp of that associated pair to the common terminal means. The lamps have a filament-type ignition means, and the resistance value of each lamp filament lies within a predetermined range of resistance values. In this manner, the firing circuit to which the lamp array terminal means are connected can perform a monitoring function by passing a current of limited predetermined maximum value through each unexpended flashlamp to derive alignment signals which function to align a flashlamp sequencing circuit to bypass inoperative lamps. Accordingly, if the photoflash unit comprises ten lamps operated from a common terminal and five selective terminals, a first firing pulse will cause ignition of the directly connected lamp of the first pair of lamps, whereupon the normally open radiation switch asociated with that pair of lamps will be converted from a high to low resistance so as to directly connect the second of the first pair of lamps between the first selective terminal means and the common terminal means. Thereafter the second firing pulse will bypass the expended first lamp and cause the second lamp to be ignited via the actuated radiation switch connected between that lamp and the common terminal means. The third firing pulse will then be applied to the second terminal means connected to the second pair of lamps to ignite the lamp directly connected to that second terminal means. This firing sequence proceeds through the remaining lamps and lamp pairs as described with respect to the first lamp pair.

In the event the directly connected lamp of an associated pair is defective, however, it is clear that the result would be two lost flashes. In accordance with the present invention, the redundant switching results in only the defective first lamp being lost. If, for example, the first lamp in the sequence has an open filament, the automatic searching circuit within the camera will find the first usable flash at the third position in the firing sequence and fire that lamp. The radiation switch and circuit pattern arrangement according to the present invention provide that the second lamp in the firing sequence can be switched to the common by either the first or third lamps by virtue of a parallel switch arrangement. Hence, either adjacent lamp can accomplish the required switching. Likewise, the fourth, sixth and eigth lamp can be switched by either adjacent odd-numbered lamp. Accordingly, going back to the original example whereby the first lamp in the sequence has an open filament and the third lamp is fired, the light emitted from the ignited third lamp will convert the parallel radiation switch arrangement, and the second lamp in the sequence will be electrically connected between its selective terminal and the common terminal. As a result, the automatic searching circuit in the camera will then flash the second lamp in the array. Thus, the flash sequence for this example will be three, two, four, five, six, seven, eight, nine and ten. The printed circuit board implementation according to the invention particularly facilitates this operational arrangement in a reliable, compact, low-cost photoflash unit. The printed circuit implementation also provides maximum contact area for reliable activation of the radiation switch paste, and the circuit orientation and gap tolerance provided by this design can be readily mass-produced.

BRIEF DESCRIPTION OF THE DRAWINGS

This invention will be more fully described hereinafter in conjunction with the accompanying drawings, in which.

DESCRIPTION OF PREFERRED EMBODIMENT

Figure 1:
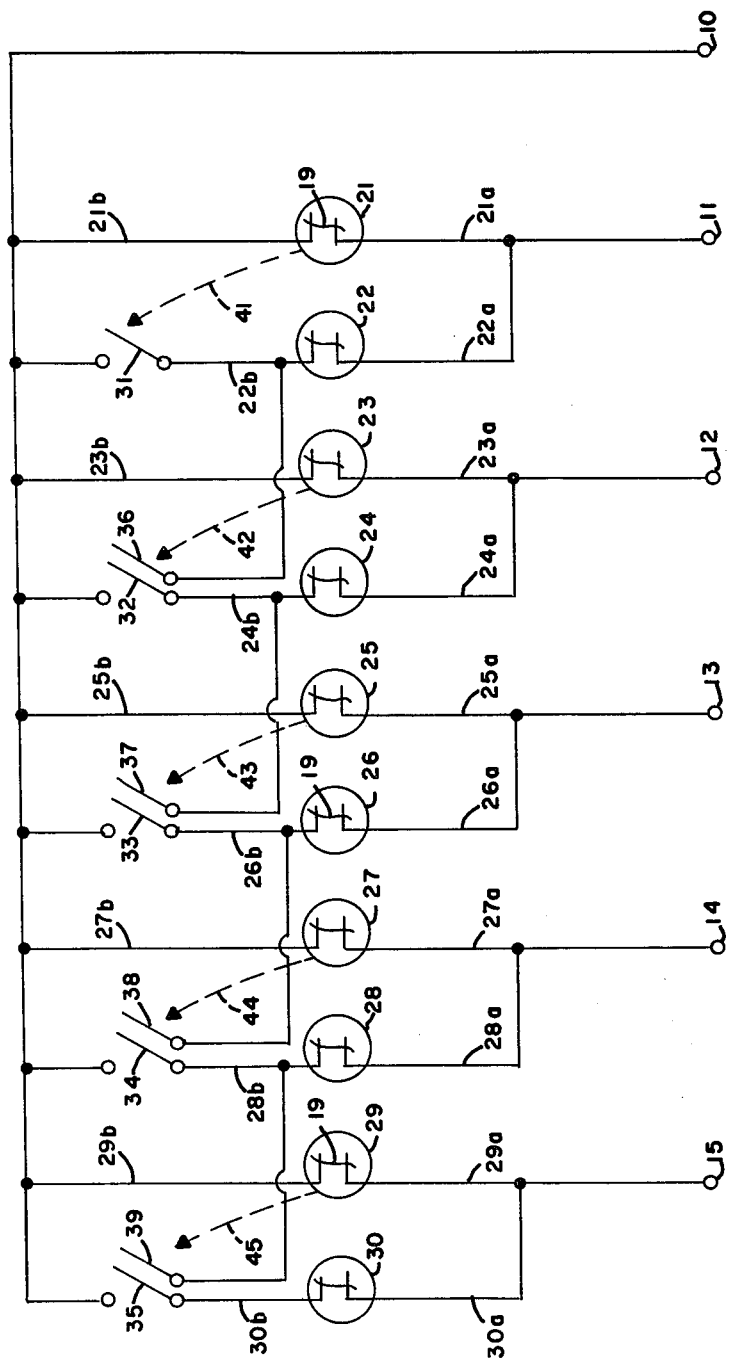
FIG. 1 is an electrical schematic diagram of a circuit used in the photoflash unit of the invention.

The present photoflash unit provides a useful implementation of a circuit for selectively operating pairs of lamps, one at a time, in a linear array through an arrangement of solid state radiation switches. In addition, however, this circuit implementation provides a switching redundancy for selected lamps in the firing sequence so as to enhance reliability by reducing the number of lamps rendered inoperative as a result of the occurrance of one or more defective lamps. FIG. 1 shows a schematic diagram of a specific circuit particularly useful for this function of selective pairing of photoflash lamps with redundant switching. The circuit is provided with a common terminal 10 and five selective terminals 11-15 adapted for engagement with a socket contact of a source of lamp firing pulses. For example, the source of firing pulses may comprise an electronic circuit such as that described in U.S. Pat. No. 3,618,492, which may be incorporated in a camera or a flash attachment for use with the camera and adapted to generate low voltage pulses in synchronization with the actuation of a camera shutter mechanism. The circuit includes an array of ten photoflash lamps 21-30, which may be of the low voltage type, each containing a filament 19 connected across a pair of lead-in wires 21a, 21b, etc., and adapted for initiating a flash of combustible material contained within the bulb.

The array of ten lamps 21-30 are arranged in five pairs which are respectively associated with the five selective terminals 11-15. Each of the selective terminals 11-15 is connected in electrical circuit to a first lead-in wire of each of the lamps of a respective pair of lamps. That is, terminal 11 is connected to lead-in wires 21a and 22a of lamps 21 and 22, respectively; selective terminal 12 is connected to lead-in wires 23a and 24a of lamps 23 and 24, respectively; terminal 13 is connected to lead-in wires 25a and 26a of lamps 25 and 26, respectively; terminal 14 is connected to lead-in wires 27a and 28a of lamps 27 and 28, respectively; and the selective terminal 15 is connected to lead-in wires 29a and 30a of lamps 29 and 30, respectively.

Common terminal 10 is associated with all ten of the lamps 21-30 and directly connected in electrical circuit to a second lead-in wire of one of the lamps of each of the respective pairs of lamps. That is, common terminal 10 is directly connected to lead-in wires 21b, 23b, 25b, 27b and 29b of lamps 21, 23, 25, 27 and 29, respectively.

The array circuit further includes a plurality of flash-actuated, normally open switches 31-35 which are positioned external of and adjacent to respective ones of the lamps of the array which are directly connected between a selective terminal and the common terminal. Each normally open switch is coupled in electrical circuit between the common terminal and the second lead-in wire of the non-directly-connected lamp of an associated pair of lamps. More specifically, a first switch 31 is coupled between common terminal 10 and lead-in wire 22b, and disposed adjacent to the first lamp 21, as indicated by the dashed line arrow 41; a second switch 32 is coupled between common terminal 10 and lead-in wire 24b, and associated with or positioned near the third lamp 23 as indicated by the dashed line arrow 42; a third switch 33 is coupled between common terminal 10 and lead-in wire 26b, and disposed adjacent to the fifth lamp 25 as indicated by the dashed line arrow 43; a fourth switch 34 is coupled between common terminal 10 and lead-in wire 28b, and disposed adjacent to the seventh lamp 27, as indicated by the dashed line arrow 44; and a fifth switch 35 is coupled between common terminal 10 and lead-in wire 30b, and positioned adjacent to the ninth lamp, as indicated by the dashed line arrow 45.

In accordance with the aforementioned redundancy feature, the array circuit further includes a plurality of flash actuated, normally open switches 36-39 which are positioned external of and adjacent to respective ones of four lamps of the array which are directly connected between a selective terminal and the common terminal. More specifically, the redundant switches 36-39 are positioned adjacent to and functionally associated with the switches 32-35, respectively. Each of the normally open redundant switches 36-39 is coupled in electrical circuit between the common terminal and the second lead-in wires of the non-directly-connected lamp of a pair of lamps immediately preceding, in firing sequence, the lamp with which that switch is functionally associated with for actuation. More specifically, a first redundant switch 36 is coupled between common terminal 10 and lead-in wire 22b and disposed adjacent to the third lamp 23, as indicated by the dashed line arrow 42; a second redundant switch 37 is coupled between common terminal 10 and lead-in wire 24b and associated with or positioned near the fifth lamp 25 as indicated by the dashed line arrow 43; a third redundant switch 38 is coupled between common terminal 10 and lead-in wire 26b, and disposed adjacent to the seventh lamp 27 as indicated by the dashed line arrow 44; and the fourth redundant switch 39 is coupled between common terminal 10 and lead-in wire 28b and disposed adjacent to the ninth lamp 29, as indicated by the dashed line arrow 45. Thus, the second lead-in wire of the second lamp of each of the respective pairs of ten lamps, except for the last, or tenth, of the lamps in the ignition sequence, is coupled in electrical circuit through a respective parallel pair of the normally open switches to the common terminal 10. More specifically, lead-in wire 22b of the second lamp 22 is coupled through the parallel pair of normally open switches 31 and 36 to the common terminal; lead-in wire 24b of the fourth lamp 24 is coupled through the parallel pair of normally open switches 32 and 37 to the common terminal; the lead-in wire 26b of the sixth lamp 26 is coupled through the parallel pair of normally open switches 33 and 38 to the common terminal; and lead-in wire 28b of the eighth lamp 28 is coupled through the parallel pair of normally open switches 34 and 39 to the common terminal. The single switch 35 is coupled in electrical circuit between the common terminal and lead-in wire 30b of the tenth lamp 30.

Figure 2:
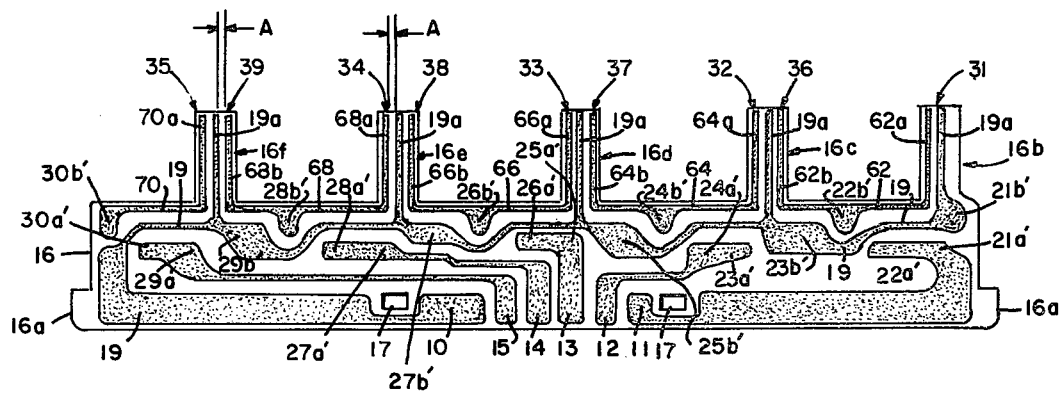
FIG. 2 is a front elevation of a circuit board of a photoflash unit according to the invention, the lamps and switch paste not being shown so as to more clearly illustrate the circuit patterns.
Figure 3:
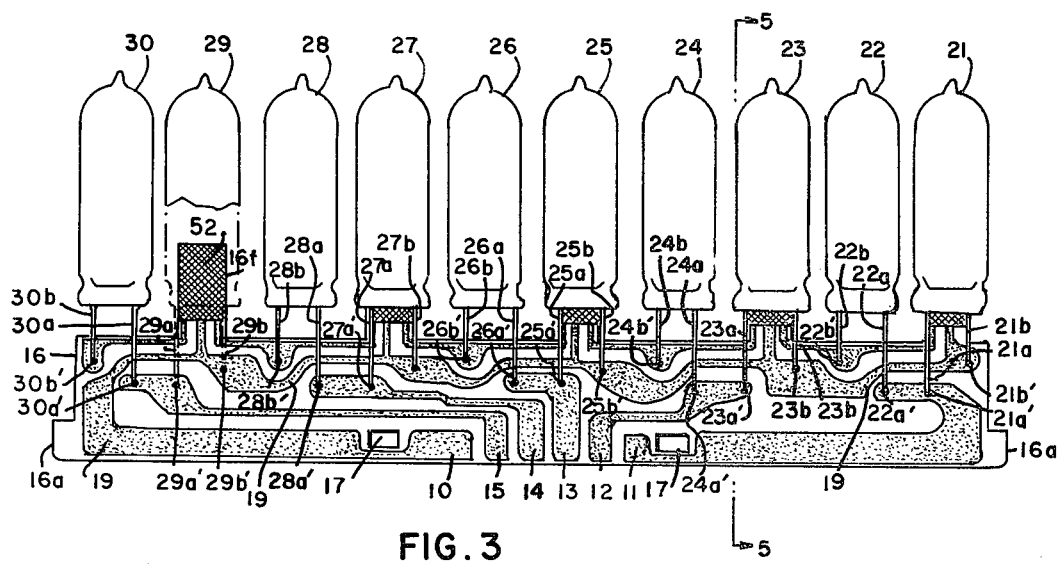
FIG. 3 is a front elevation of the circuit board showing all ten lamps attached, with one of the lamps broken away to show the disposition of switch paste on a circuit board extension.

FIGS. 2 and 3 illustrate an implementation of this photoflash array circuitry, in accordance with the present invention, wherein conductor runs are disposed in a pattern on a uniquely shaped printed circuit board containing solid state radiation switches. The circuit board 16 has a substantially rectangular portion with a pair of laterally projecting tabs 16a and a pair of rectangular openings 17 for facilitating an engageable connection tab for the unit. A circuit board having engageable means such as the openings 17 is described in a copending application Ser. No. 181,934, filed Aug. 27, 1980, and assigned to the present assignee. Of course, alternative tab engagement and connection facilitating means other than the projecting tabs 16a and openings 17 may be employed.

The upper side of the circuit board has five spaced apart extensions 16b-16f which extend vertically above the rectangular portion of the circuit board. The ten lamps 21-30 are attached to this circuit board, as shall be described in detail hereinafter, and disposed in a horizontal linear array with the longitudinal axes of respective lamps aligned in parallel, as best shown in FIG. 3. The lamps and circuit board extensions are disposed at regular intervals, as illustrated, with the circuit board extensions being located behind alternate lamps of the linear array. Thus, extension 16b is disposed behind lamp 21; extension 16c is disposed behind lamp 23; extension 16d is disposed behind lamp 25; extension 16e is disposed behind lamp 27; and extension 16f is disposed behind lamp 29. Further, lamp 22 is disposed between the extensions 16b and 16c; lamp 24 is disposed between the extensions 16c and 16d; lamp 26 is disposed between the extensions 16d and 16e; lamp 28 is disposed between the extensions 16e and 16f; and lamp 30 is disposed between extension 16f and the end of the circuit board.

Figure 5:
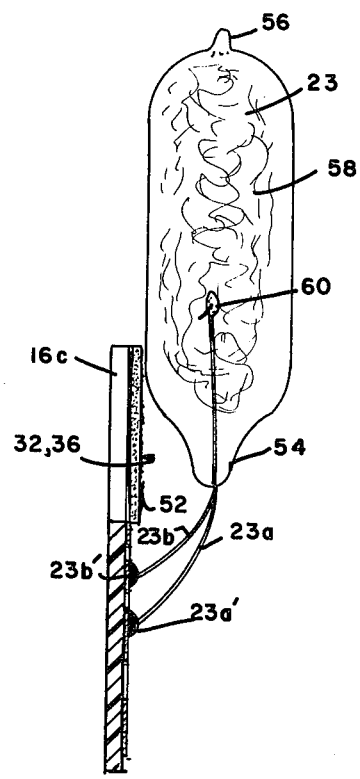
FIG. 5 is an enlarged side view, partly in section, taken along 5—5 of FIG. 3, showing a lamp connected to the circuit board of FIG. 3 adjacent an extension thereof.
Figure 6:
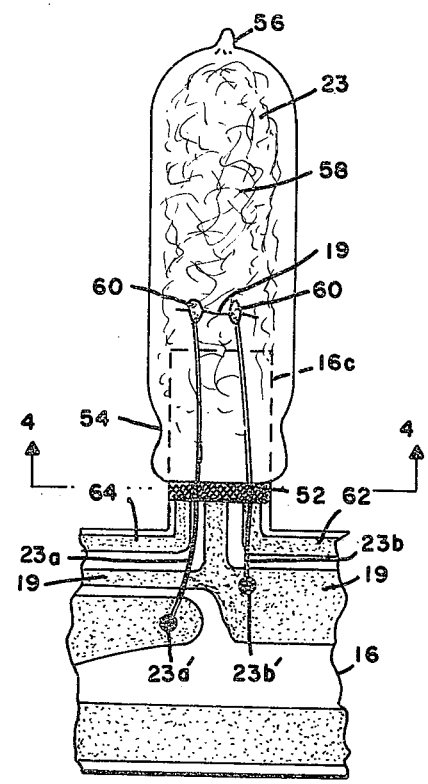
FIG. 6 is a fragmentary elevational front view of FIG. 5

Located adjacent to one another along the bottom side edge of the circuit board are the terminal areas 10-15, which are selectively interconnected via conductor runs, either directly or through switches 31-35 and 36-39, with a plurality of lamp contact areas 21a', 21b' through 30a', 30b', which are disposed on the rectangular portion of the circuit board. Each of the flashlamps 21-30 has a pair of lead-in wires 21a, 21b, etc., which are attached to respective ones of the lamp contact areas 21a', 21b', etc., such as by soldering. For example the attachment of the lead-in wires of lamps 21-30 are illustrated in FIG. 3, and the attachment of the lead-in wires of lamp 23 to the circuit board contact areas are illustrated in FIGS. 5 and 6. Returning to the conductive circuit pattern, the terminal 10 forms a part of, and is connected to a common circuit conductor run 19 which is directly connected in electrical circuit to a lead-in wire of one of the lamps of each of the respective pairs of lamps at lamp contact areas 21b', 23b', 25b', 27b', and 29b'. Each of the selective terminals 11-15 is connected in electrical circuit to a lead-in wire of each of the lamps of a respective pair of lamps via the associated lamp contact areas. That is, selective terminal 11 is directly connected to the lamp contact areas 21a' and 22a'; selective terminal 12 is directly connected to the lamp contact areas 23a' and 24a'; selective terminal 13 is directly connected to lamp contact areas 25a' and 26a'; selective terminal 14 is directly connected to lamp contact areas 27a' and 28a'; and the selective terminal 15 is directly connected to lamp contact areas 29a' and 30a'.

The common terminal 10 and the five selective terminals 11-15 along the bottom side edge of the circuit board are adapted for engagement with the socket contacts of a source of lamp firing pulses. For example, the source of firing pulses for connection to these terminals may comprise an electronic circuit such as described in U.S. Pat. No. 3,618,492, which may be incorporated in a camera or a flash attachment for use with the camera and adapted to generate low voltage pulses in synchronization with the actuation of a camera shutter mechanism. Further, it will be noted that the common terminal 10 is shaped to provide a rather wider conductive area than the terminals 11-15; in this manner, the common terminal 10 may be employed for bridging camera socket contacts to convert the camera to a flash mode of operation, as described in U.S. Pat. No. 3,757,643.

The entire printed circuit is provided on the same one side of the circuit board, namely, the obverse side of the board to which the flashlamp lead-in wires are connected. The substrate of the board 16 comprises an insulating material, such as XP phenolic, and the pattern of electrically conductive circuit runs is provided on the board surface by means such as silk screening, chemical etching, etc. According to a preferred embodiment, however, the circuit patterns are formed of die-stamped copper, thereby providing significant cost advantages. For example, U.S. Pat. No. 3,990,142 describes a die-stamped printed circuit board, and copending application Ser. Nos. 131,614 now U.S. Pat. No. 4,320,572 and 131,711, now U.S. Pat. No. 4,325,771, both filed Mar. 19, 1980, and assigned to the present assignee, describe die-stamped circuit boards for photoflash devices.

Referring now more particularly to the normally open connect switches 31-35 and 36-39, each such switch preferably comprises a solid state mass of material interconnected to spaced-apart electrical terminals in the circuit. Each of these switches are located on a respective one of the circuit board extensions and are formed by portions of the conductive circuit patterns spaced apart on the extensions to form predetermined gaps therebetween and having a mass of switch material disposed thereover to bridge the gap between the circuit patterns. More specifically, in the embodiment illustrated by FIGS. 2-6, each of the circuit board extensions 16c-16f contain three conductor run segments which extend vertically thereon for substantially the full height of the circuit board segment. The first circuit board extension 16b contains two conductor run segments which extend vertically on the extension in like manner. One of these vertical conductor segments, denoted as 19a on each extension, comprises a portion of the common circuit conductor run 19. The other vertical conductor run segments are provided as follows. The second lead-in wire of the second lamp of each of the respective pairs of ten lamps, except for the last, or tenth lamp, is connected to a respective lamp contact area which in turn is connected to a respective one of the circuit patterns having a pair of vertically extending portions. One of the vertical extending portions of the pair is located on the circuit board extension behind the prior lamp in the ignition sequence, while the other of the extending portions of the pair is on the circuit board extension behind the next lamp in sequence. More specifically, lead-in wire 22b of the second lamp 22 is connected to a lamp contact area 22b', which in turn forms part of, and thus is connected to, a conductive circuit pattern 62 having a pair of vertically extending portions 62a and 62b. The vertically extending portion, or segment 62a, is located on the circuit board extension 16b behind the prior lamp 21, while the vertically extending segment 62b is located on the circuit board extension 16c behind the next lamp 23. Each of the vertically extending segments 62a and 62b is disposed parallel with and spaced apart from the common connected segment 19a on the respective extension.

In like manner, lamp contact area 24b' is part of and connected to circuit pattern 64 having a pair of vertically extending portions 64a and 64b with segment 64a on extension 16c behind the prior lamp 23, and with the extending segment 64b being located on extension 16d behind the next lamp 25. The lamp contact area 26b' is connected to circuit pattern 66 connected to vertically extending portions 66a and 66b; the vertical segment 66a being disposed behind lamp 25 on extension 16d, and the vertical segment 66b being disposed on extension 16e behind the next lamp 27. Lamp contact area 28b' is connected to circuit pattern 68 having the pair of vertically extending portions 68a and 68b; segment 68a being located behind lamp 27 on circuit board extension 16e, and the segment 28b being disposed on circuit board extension 16f behind the next lamp 29. Finally, the last lamp contact area 30b is connected to a circuit pattern 70 having a vertically extending portion 70a which is disposed on the circuit board extension 16f behind the prior lamp 29. The vertically extending circuit segments 19a and 62a on extension 16b form the terminal components of switch 31. The electrically isolated and spaced apart circuit segments 19a, 64a and 62b on circuit board extension 16c form the terminal components of 32 and 36; that is, segments 64a and 19a are components of switch 32, while the segment 19a and segment 62b are components of switch 36. Hence, on this circuit board extension 16c, segment 19a is a common circuit component for both switches 32 and 36 and disposed between the other two circuit segments 64a and 62b located on that extension.

In like manner, the extending common circuit segment 19a on circuit board extension 16d is disposed between the other two vertical segments 66a and 64b thereon to provide the terminal components of switches 33 and 37; that is, segments 66a and 19a are components of switch 33, and segments 19a and 64b are components of switch 37. On circuit board extension 16e the centrally disposed common circuit segment 19a together with the segments 68a and 66b form the terminal components of switches 34 and 38; that is, 68a and 19a are components of switch 34, and segment 19a and 66b are components of switch 38. Finally, segments 70a, 19a and 68b on circuit board extension 16f form the components of switches 35 and 39; that is, segments 70a and 19a are components of switch 35 and segments 19a and 68b are components of switch 39.

Figure 4:
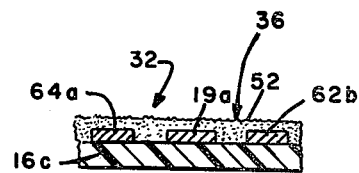
FIG. 4 is an enlarged cross-sectional view taken along 4—4 of the circuit board extension in FIG. 6.

Each of the switches is then completed by disposing a mass of switch material 52 on at least a portion of each of the extensions to cover substantially the full width thereof and thereby bridge and interconnect the vertically extending circuit conductors on the surface of the extension. In FIG. 2 the switch material is illustrated covering a portion of one side of the circuit board extensions 16b–16f and FIG. 4 illustrates a cross section of the circuit board extension 16c with the switch mass 52 bridging the conductor runs 64a, 19a and 62b.

The material 52 for the connect switches is selected to be of the type initially having an open circuit or high resistance, the resistance thereof becoming converted to a lower value when the material receives radiation in the form of heat and/or light from a respective, adjacent lamp upon the lamp being flashed. One type of solid state switch which operates in this manner is described in U.S. Pat. No. 3,458,270 of Ganser et al., in which the use of silver oxide in a polyvinyl binder is taught as a normally open radiant energy switch. Upon radiant heating, the silver oxide decomposes to give a metallic silver residue which is electrically conductive.

A preferred switch composition for a photoflash array operated by low voltage firing pulses, such as the present specific embodiment, is described in a copending application Ser. No. 148,358, filed May 9, 1980 and assigned to the present assignee, and comprises by dried weight 35–70% silver carbonate and/or silver oxide, 30–60% silver-coated glass beads, and 1–20% binder. Further modifications of the switch composition for facilitating control of the switch conversion time are described in a copending application Ser. No. 148,119, filed May 9, 1980, now U.S. Pat. No. 4,336,570 and assigned to the present assignee.

A specific example of a low voltage switch composition, particularly useful in this application and described in the aforementioned copending application Ser. No. 148,358, now U.S. Pat. No. 4,330,821, comprises the following dried weight proportions: 50% silver carbonate, 40% silver coated glass beads, and 10% polystyrene binder. The mixture is made into a paste by ball milling in a suitable solvent such as butyl cellosolve acetate. The solids content may be adjusted to suit the method of switch application. For silk screening over the circuit board, we prefer to adjust the solids content to about 74%. This low voltage switch paste was then screen-printed using a 105 mesh stainless steel screen with a two mil emulsion build-up. The gap A (see FIG. 2) between spaced apart copper conductor runs on each of the circuit board extensions was about 0.030 inch. The mixture is deposited as a mass of material across these spaced apart conductor runs to provide a patch of paste material 52 which covers about 0.037 square inch on each circuit board extension, as illustrated in FIG. 3, and as shown in different views for the switches 32 and 36 on circuit board extension 16c in FIGS. 4 and 5.

When the flashlamps 21–30 are mounted on the circuit board 16, as illustrated, each of the switches 31, (32 and 36), (33 and 37), (34 and 38), and (35 and 39) are then disposed behind alternate ones of the linear array of flashlamps, with each of the flashlamps 21, 23, 25, 27 and 29 being in near contact with the surfaces of the respective switch or switch combinations. For example, the positioning of flashlamp 23 with respect to the switch combination 32 and 36 on circuit board extension 16 is illustrated in FIGS. 5 and 6. As particularly shown for lamp 23 in FIGS. 5 and 6, each of the lamps 21, etc., has a tubular, hermetically sealed, light-transmitting glass envelope having a press seal base 54 at one end through which the lead-in wires emerge and a tip off 56 at the other end. The exterior of the envelope is coated with a transparent protective material (not shown), such as cellulose acetate lacquer, and the interior is filled with a quantity of filamentary combustible material 58, such as shredded zirconium, and a combustion supporting gas, such as oxygen. The ignition means within the lamp envelope comprises a filament 19 connected across the inner ends of the lead-in wires (in this case the leads 23a and 23b) with beads of primer material 60 disposed about the junction of the lead-in wires and the filament.

As illustrated, each of the extended portions of the circuit board that supports the one or more radiation-activated switches should be sized so that the width thereof is at least one-half of the inside diameter of the respectively adjacent lamp envelope, and the vertical projection of the extension above the rectangular portion of the circuit board is at least one-half of the height of the ignition means in the respectively adjacent lamp. In a preferred construction, each of the circuit board extensions has a width of about 0.170 inch (85% of the ID of the lamp envelope) and a length of 0.400 inch (120% of the height of the ignition means). As previously described, the circuit patterns extend vertically on each of the extensions for substantially the full height thereof, and the switch material is disposed to cover substantially the full width of the extension and thereby bridge the gaps between and interconnect the vertically extending circuit patterns thereon. In this manner, additional length is provided over prior art solid state switches to obtain a long circuit path and assure low ohmic switch contact-to-circuit runs. The design provides maximum contact area for reliable activation of the radiation-activated switch paste; that is, there is a large surface area over which a radiant, activated switch material can make contact to the circuit. This is particularly desirable due to the variations in radiation from individual lamps. Additional switch surface area can be provided if irregular shaped circuit runs are used instead of straight runs. Another advantageous aspect of the invention is that the described switch implementation provides circuit gap tolerances that can be more easily mass produced. For example, the gap A (see FIG.

2) between the conductor runs may vary from 0.010 inch to 0.060 inch, with a preferred gap of about 0.030 inch. The actual switch closure time is more readily controlled with the chemical composition of the radiation-activated switch paste, with very little or no effect from the circuit gap.

A particularly useful reflector configuration that may be employed with the present photoflash unit is described in copending application Ser. No. 217,723, filed Dec. 18, 1980, now U.S. Pat. No. 4,371,915 and assigned to the present assignee, and a useful housing enclosure for the unit as described in copending application Ser. No. 181,936, filed Aug. 27, 1980 and assigned to the present assignee.

The unit functions as follows upon the terminals 10 and 11-15 being connected to a source of firing pulses, for example, such as described in the previously mentioned U.S. Pat. Nos. 3,618,492 and 3,757,643. Assuming that none of the ten lamps of the unit have been flashed, upon occurrence of a first firing pulse across terminals 10 and 11, this pulse will be directly applied to the lead-in wires of the first connected flashlamp 21, whereupon lamp 21 flashes and becomes an open circuit between its lead-in wires 21a and 21b. Heat and/or light radiation from the flashing first lamp 21 is operative via path 41 (FIG. 1) to activate the normally open switch 31 located on circuit board extension 16b immediately behind the lamp. The radiation causes the normally open connect switch 31 to become a closed circuit (or a low value of resistance), thereby connecting common terminal 10 to the second lamp 22. By the time this occurs, the firing pulse should have diminished to a value insufficient to cause the second lamp 22 to flash.

In the electronic circuit described in the aforementioned U.S. Pat. No. 3,618,492, a monitoring function is provided wherein a current of limited predetermined maximum value is applied through each unexpended flashlamp. This monitoring current is generated prior to the ignition of a given one of the flashlamps. In this manner, alignment signals are derived which function to align the flashlamp sequencing circuit to bypass inoperative flashlamps. This monitoring function is dependent upon the resistance across the lamp lead-in wires. Accordingly, the resistance values of lamp filaments 19 are selected to lie within a predetermined range; typically, the filament in each lamp has a resistance value in the range of about 0.5 to 1.5 ohms. Thus, if the monitoring circuit senses a significantly higher resistance across the lamp lead-in wires, say, for example, higher than 50 ohms or 75 ohms, the selected terminal connected to that lamp will be bypassed, and the firing pulse will be applied across the operative lamp connected to the next successive select terminal. On the other hand, if the monitoring circuit senses a resistance below the preselected level (that is, below 50 ohms or 75 ohms) a firing pulse will be applied to the selective terminal connected to that lamp.

In the present instance, assuming no defective lamps, with the first lamp 21 having been fired, but with the switch 31 having been closed, the monitoring circuit would continue to sense an unexpended lamp, namely lamp 22, connected between selective terminal 11 and the common terminal 10. Accordingly, when the next firing pulse occurs, it is applied to the lead-in wires of the second lamp 22, via the now closed connect switch 31, whereupon the second lamp 22 flashes. Since both lamps 21 and 22 have now been fired, the monitoring circuit will cause the firing pulse alignment to bypass terminal 11 and proceed to terminal 12, to which the unexpended lamp 23 is directly connected. Hence, when the next firing pulse occurs, it is applied directly to the third lamp 23, thereby firing that lamp, whereupon the radiation from lamp 23 activates connect switch 32 to become essentially a closed circuit across its terminals. Since the redundant switch 36 is located on circuit board extension 16c adjacent to switch 32 and, thus, also exposed to the radiation from lamp 23, the switch 36 also becomes a closed circuit at the same time as switch 32; the significance of this redundant switch operation will be described hereinafter. The next firing pulse will be applied via the now closed connect switch 32 to lead-in wires of the fourth flashlamp 24, thereupon causing that lamp to flash. The foregoing pattern of operation then continues with respect to selective terminals 13, 14 and 15 to cause the sequential firing of lamps 25-30. Hence, a total of 2n lamps (10 lamps) have been ignited from n selective terminals (5) together with a common terminal.

In accordance with the redundant switching circuit implementation according to the present invention, however, assume that the first lamp 21 is defective, such as by having an open filament. In this event, an open circuit is indicated across lead-in wires 21a and 21b, and since lamp 21 cannot flash to radiantly activate switch 31, the normally open switch will always remain open. In such a case, therefore, the camera monitoring circuit will cause the firing pulse alignment to bypass terminal 11 and proceed to terminal 12, to which the unexpended lamp 23 is directly connected. Hence, when the next firing pulse occurs, it is applied directly to the third lamp 23, thereby firing that lamp, whereupon the radiation from lamp 23 activates both connect switches 32 and 36 to essentially become closed circuits across the terminals thereof. The camera monitoring circuit will now sense an unexpended lamp connected to terminal 11, namely, lamp 22, connected between selective terminal 11 and the common terminal 10 via the switch 36 which has been closed due to the flashing of a third lamp 23. Accordingly, when the next firing pulse occurs, it is applied to the lead-in wires of the second lamp 22, via the now closed connect switch 36, whereupon the second lamp 22 flashes. The next firing pulse will be applied via the closed connect switch 32 to the lead-in wires of the fourth flashlamp 24, thereupon causing that lamp to flash. Assuming that there are no remaining defective lamps, the pattern of operation will then proceed as described hereinbefore. That is, the flash sequence in this example will be lamp 23, lamp 22, lamp 24, lamp 25, lamp 26, lamp 27, lamp 28, lamp 29 and lamp 30.

The operation of the redundant switching arrangement should now be clear; however, one more example will be given wherein it is assumed that only the lamp 23 is defective, such as by having an open filament. In this instance, upon occurrance of a first firing pulse across terminals 10 and 11, this pulse will be directly applied to the lead-in wires of the first connected flashlamp 21, whereupon the lamp 21 flashes and becomes an open circuit between its lead-in wires 21a and 21b. Heat and/or light radiation from the flashing first lamp 21 is operative via path 41 (FIG. 1) to activate the normally open switch 31 located on circuit board extension 16b immediately behind the lamp. The radiation causes the normally open connect switch 31 to become a closed circuit, thereby connecting common terminal 10 to the second lamp 22. With a first lamp 21 having been fired, but with the switch 31 having been closed, the monitoring circuit would continue to sense a nonexpended lamp, namely, lamp 22, connected between selective terminal 11 and the common terminal 10. Accordingly, when the next firing pulse occurs It is applied to the lead-in wires of the second lamp 22 via the now closed connect switch 31, whereupon the second lamp 22 flashes. Since both lamps 21 and 22 have now been fired, the monitoring circuit will cause the firing pulses alignment to bypass terminal 11 and proceed to terminal 12 to which the defective, say open filament, lamp 23 is directly connected. Lamp 23 will indicate an open circuit across its lead-in wires 23a and 23b, and since lamp 23 cannot be fired, the normally open switch combination 32 and 36 will remain open. As a result, the monitoring circuit will cause the firing pulse alignment to also bypass terminal 12 and proceed to terminal 13, to which the unexpended lamp 25 is directly connected. Hence, when the next firing pulse occurs, it is applied directly to the fifth lamp 25, thereby firing that lamp, whereupon the radiation from lamp 25 activates the combination of connect switches 33 and 37 to become essentially closed circuits across the terminals thereof. The next firing pulse will be applied via the now closed connect switch 37 to the lead-in wires of the fourth flashlamp 24 thereupon causing that lamp to flash. When the next firing pulse occurs, the monitoring circuit will cause the firing pulse alignment to bypass terminal 12 and sense an unexpended lamp, namely, lamp 26, connected between selective terminal 13 and the common terminal 10. Accordingly, when the next firing pulse occurs, it will be applied via the now closed connect switch 33 to the lead-in wires of the sixth flashlamp 26. Thereafter the pattern of operation continues as hereinbefore described. The flash sequence for this last example, therefore, will be lamp 21, lamp 22, lamp 25, lamp 24, lamp 26, lamp 27, lamp 28, lamp 29 and lamp 30.

Hence, this circuit pattern implementation of redundant switches enables the second lamp in the ignition sequence to be switched to the common circuit by either the first or third lamp; therefore, either adjacent lamp can accomplish the required switching. Likewise, the fourth, sixth, and eighth lamps can be switched by either adjacent odd-numbered lamp. Without this redundant switching, a defective lamp at a switch position (odd-numbered lamps) would result in two lost flashes; however, with redundant switching only one lamp in the pair is lost. Of course, there are variations of the failure scenario. For example, in the very rare instance where two first lamps, say for example lamps 21 and 23, are both defective, then it is clear that the redundant scheme would result in a loss of three lamps, rather than a loss of four lamps without redundancy. That is, since lamp 23 was also defective, then the redundant switch 36 would not be activated, whereupon the camera would be unable to flash lamp 22; however, a subsequent flashing of lamp 25 to close switch 37 would enable the camera to flash lamp 24. Of course, the redundancy feature cannot be applied to the last pair of lamps since lamp 30 has only one adjacent lamp.

Although the invention has been described with respect to specific embodiments, it will be appreciated that modifications and changes may be made by those skilled in the art without departing from the true spirit and scope of the invention. For example, the circuit board 16 may take other shapes not employing vertical extensions such as 16b-16f. Further, the extending circuit segments forming the switch terminals may be grouped in configurations behind alternate lamps in the firing sequence other than the illustrated vertical extensions. Also, the lamps may be arranged in other types of planar arrays. Further yet, n may be two or greater, i.e., the circuit board approach is applicable to arrays of four lamps, six lamps, eight lamps, etc.

I claim:

1. A multilamp photoflash unit comprising, in combination:

a printed circuit board having electrically conductive circuit patterns disposed on a surface thereof, said circuit patterns including a plurality of $n+1$ terminal areas at one side edge of said circuit board and a plurality of $4n$ lamp contact areas disposed at selected spaced apart locations on said circuit board, where $n \geq 2$;

a plurality of $2n$ flashlamps attached to said circuit board and disposed in a planar array, each of said lamps having first and second lead-in wires secured in electrical connection with respective ones of said lamp contact areas, and all of said terminal areas and lamp contact areas connected to said lead-in wires being disposed on the same one side of said circuit board;

n of said terminal areas being selective terminals each associated with a respective pair of said $2n$ lamps, each of said selective terminals being electrically connected via one of said circuit patterns to a pair of lamp contact areas each connected to the first lead-in wire of a lamp of said respective pair;

one of said terminal areas being a common terminal associated with all of said $2n$ lamps and directly connected via one of said circuit patterns to n lamp contact areas each connected to the second lead-in wire of a first lamp of each of said respective pairs of $2n$ lamps;

said common and selective terminal areas being adapted for connection to a source of firing pulses, and said lamps being adapted via said circuit board connectons for ignition according to a predetermined sequence in response to successive firing pulses applied to said terminal areas;

portions of said conductive circuit patterns extending in groups of electrically isolated segments behind alternate lamps of said predetermined ignition sequence, the extending circuit pattern segments of each of said groups being spaced apart to form pedetermined gaps therebetween;

a mass of switch material disposed on each of said groups of extending circuit pattern segments and bridging said gaps between circuit pattern segments of the group, thereby providing a solid state radiation switch means on each of said groups of extending circuit pattern segments behind and adjacent to a respective lamp for receiving radiant energy emitted by that lamp;

each of said first lamps directly connected to the common terminal being in front and adjacent to a respective one of said groups of extending circuit pattern segments, said circuit pattern directly connected to the common terminal having an extending segment portion in each of said groups;

the second lead-in wire of the second lamp of each of said respective pairs of $2n$ lamps, except for the last of the $2n$ lamps in the ignition sequence, being connected to a respective lamp contact area which is connected to a respective one of said circuit patterns having a pair of extending segment portions, one of the segment portions of said pair being in the group of extending segments behind the prior lamp in sequence, and the other segment portion of said pair being in the group of extending segments behind the next lamp in sequence;

the second lead-in wire of the last of the 2n lamps in the ignition sequence being connected to a respective lamp contact area which is connected to a respective one of said circuit patterns having an extending segment portion in the group of extending segments behind the prior lamp in sequence; and each of said radiation switch means being capable of conversion from a high electrical resistance to a low electrical resistance when exposed to radiation emitted from a flashlamp disposed adjacent to the switch means.

2. The photoflash unit of claim 1 wherein each of said lamps has a filament connected across the lead-in wires thereof.

3. The photoflash unit of claim 2 wherein the resistance value of said lamp filament lies within a predetermined range of resistance values.

4. The photoflash unit of claim 2 wherein said filament of each of said lamps has a resistance value in the range of about 0.5 to 1.5 ohms.

5. The photoflash unit of claim 1 wherein $n=5$.

6. The photoflash unit of claim 1 wherein the group of said extending electrically isolated circuit pattern segments behind the first lamp in the ignition sequence consists of two spaced apart segments, and each of the remaining groups of said extending electrically isolated circuit pattern segments consists of three spaced apart segments, with the segment extending from said circuit pattern directly connected to the commmon terminal being disposed between the other two segments of the group.

7. The photoflash unit of claim 6 wherein said switch means and groups of extending circuit pattern segments provide a plurality of $2n-1$ normally open switches, the second lead-in wire of the second lamp of each of said respective pairs of 2n lamps, except for the last of the 2n lamps in the ignition sequence, being coupled in electrical circuit through a respective parallel pair of said switches to said common terminal, a single one of said switches being coupled in electrical circuit between said common terminal and the second lead-in wire of the last of the 2n lamps in sequence.

8. The photoflash unit of claim 1 wherein each of the predetermined gaps between said spaced apart portions of circuit patterns on said circit board extensions is in the range of 0.010 inch to 0.060 inch.

9. A multilamp photoflash unit comprising, in combination:

a printed circuit board having electrically conductive circuit patterns disposed on a surface thereof;

a plurality of 2n flashlamps, wherein $n \geq 2$, attached to said circuit board and disposed in a horizontal linear array with the longitudinal axes of respective lamps aligned in parallel, each of said lamps being electrically connected to respective portions of said circuit patterns;

said circuit board having a substantially rectangular portion with n spaced apart extensions projecting from and vertically above a longer side thereof, said extensions being located behind alternate lamps of said linear array;

each of said circuit board extensions containing portions of said conductive circuit patterns extending vertically in electrically isolated segments on the circuit board extension toward the top end thereof, the extending circuit pattern segments being spaced apart to form predetermined gaps therebetween;

a mass of switch material disposed on each of said circuit board extensions and bridging said gaps between circuit pattern segments so as to interconnect the vertically extending spaced apart circuit pattern segments on the circuit board extension, thereby providing a solid state radiation switch means on each of said extensions behind and adjacent to a respective lamp for receiving radiant energy emitted by that lamp;

said circuit patterns including a plurality of $n+1$ terminal areas at one side edge of said circuit board and a plurality of 4n lamp contact areas disposed on said rectangular portion of the circuit board, each of said lamps having first and second lead-in wires secured in electrical connection with respective ones of said lamp contact areas, and all of said terminal areas and lamp contact areas connected to said lead-in wires herein disposed on the same one side of said circuit board;

n of said terminal areas being selective terminals each associated with a respective pair of said 2n lamps, each of said selective terminals being electrically connected via one of said circuit patterns to a pair of lamp contact areas each connected to the first lead-in wire of a lamp of said respective pair;

one of said terminal areas being a common terminal associated with all of said 2n lamps and directly connected via one of said circuit patterns to n lamp contact areas each connected to the second lead-in wire of a first lamp of each of said respective pairs of 2n lamps;

each of said lamps directly connected to the common terminal being in front of and adjacent to a respective one of said circuit board extensions, said circuit pattern directly connected to the common terminal having a vertically extending segment portion on each of said circuit board extensions;

said common and selective terminal areas being adapted for connection to a source of firing pulses, and said lamps being adapted via said circuit board connections for sequential ignition in response to successive firing pulses applied to said terminal areas;

the second lead-in wire of the second lamp of each of said respective pairs of 2n lamps except for the last of the 2n lamps in the ignition sequence, being connected to a respective lamp contact area which is connected to a respective one of said circuit patterns having a pair of vertically extending segment portions, one of the extending segment portions of said pair being on the circuit board extension behind the prior lamp in sequence, and the other of the extending segment portions of said pair being on the circuit board extension behind the next lamp in sequence;

the second lead-in wire of the last lamp in sequence being connected to a respective one of said circuit patterns having a vertically extending segment portion on the circuit board extension behind the prior lamp in sequence; and each of said radiation switch means being capable of conversion from a high electrical resistance to a low electrical resistance when exposed to radiation emitted from a flashlamp disposed adjacent to the switch means.

10. The photoflash lamp of claim 9 wherein each of said lamps has a filament connected across the lead-in wires thereof.

11. The photoflash unit of claim 10 wherein the resistance value of said lamp filament lies within a predetermined range of resistance values.

12. The photoflash unit of claim 10 wherein said filament of each of said lamps has a resistance value in the range of about 0.5 to 1.5 ohms.

13. The photoflash unit of claim 9 wherein n=5.

14. The photoflash unit of claim 9 wherein the circuit board extension behind the first lamp in the ignition sequence has two spaced apart vertically extending segment portions of circuit patterns thereon, and each of the remaining circuit board extensions has three spaced apart vertically extending segment portions of circuit patterns thereon, with the vertical segment portion extending from said circuit pattern directly connected to the common terminal being disposed between the other two vertically extending segment portions on the circuit board extension.

15. The photoflash unit of claim 14 wherein said switch means and vertically extending segment portions of circuit patterns on said circuit board extensions provide a plurality of 2n−1 normally open switches, the second lead-in wire of the second lamp of each of said respective pairs of 2n lamps, except for the last of the 2n lamps in the ignition sequence, being coupled in electrical circuit through a respective parallel pair of said switches to said common terminal, a single one of said switches being coupled in electrical circuit between said common terminal and the second lead-in wire of the last of the 2n lamps in sequence.

16. The photoflash unit of claim 9 wherein each of the predetermined gaps between said spaced apart segment portions of circuit patterns on said circuit board extensions is in the range of 0.010 inch to 0.060 inch.

17. The photoflash unit of claim 9 wherein each of said flashlamps has a tubular envelope, and the width of each of said circuit board extensions is at least one-half the inside diameter of the respectively adjacent lamp envelope.

18. The photoflash unit of claim 9 wherein each of said flashlamps has an hermetically sealed tubular envelope with a base at one end and an igniton means sealed through said base and extending within said envelope, said 2n lamps are disposed base down in a horizontal array with the envelopes thereof projecting vertically above the rectangular portion of said ciruit board, and said n extensions of the circuit board project vertically above the rectangular portion thereof to at least one-half of the height of the ignition means in respectively adjacent lamps.

19. The photoflash unit of claim 18 wherein the width of each of said circuit board extensions is at least one-half the inside diameter of the respectively adjacent lamp envelope.

20. The photoflash unit of claim 19 wherein each of the predetermined gaps between said spaced apart segment portions of circuit patterns on said circuit board extensions is in the range of 0.010 inch to 0.060 inch.

21. The photoflash unit of claim 20 wherein portions of said circuit patterns extend vertically in electrically isolated segments on each of said circuit board extensions for substantially the full height thereof, and said mass of switch material is disposed on at least a portion of each of said extensions to cover substantially the full width thereof and thereby interconnect the vertically extending circuit pattern segments thereon.

* * * * *